United States Patent
Persson

(10) Patent No.: US 11,560,325 B2
(45) Date of Patent: Jan. 24, 2023

(54) BIO-FILTER UNIT FOR A FISH FARMING SYSTEM

(71) Applicant: N P Innovation AB, Malmö (SE)

(72) Inventor: Nils-Åke Persson, Malmö (SE)

(73) Assignee: N P INNOVATION AB, Malmo (SE)

(*) Notice: Subject to any disclaimer, the term of this patent is extended or adjusted under 35 U.S.C. 154(b) by 109 days.

(21) Appl. No.: 17/276,139

(22) PCT Filed: Sep. 4, 2019

(86) PCT No.: PCT/SE2019/050825
§ 371 (c)(1),
(2) Date: Mar. 13, 2021

(87) PCT Pub. No.: WO2020/055304
PCT Pub. Date: Mar. 19, 2020

(65) Prior Publication Data
US 2022/0048797 A1    Feb. 17, 2022

(30) Foreign Application Priority Data
Sep. 14, 2018  (SE) .................................. 1851089-1

(51) Int. Cl.
*C02F 3/06* (2006.01)
*A01K 61/10* (2017.01)
(Continued)

(52) U.S. Cl.
CPC .............. *C02F 3/06* (2013.01); *A01K 61/10* (2017.01); *A01K 63/042* (2013.01);
(Continued)

(58) Field of Classification Search
CPC .... C02F 3/06; C02F 2103/20; C02F 2209/44; C02F 2303/16; A01K 61/10;
(Continued)

(56) References Cited

U.S. PATENT DOCUMENTS 4,197,201 A    4/1980  Hjelmnér et al.
5,681,472 A   10/1997  Jonsson et al.
(Continued)

FOREIGN PATENT DOCUMENTS

CN    102849848 A  *  1/2013
JP    S63-77508 A      4/1988

OTHER PUBLICATIONS

International Search Report, PCT/SE2019/050825, dated Sep. 10, 2019.
(Continued)

*Primary Examiner* — Fred Prince
(74) *Attorney, Agent, or Firm* — Moser Taboada

(57) ABSTRACT

Bio-filter unit (1) intended for a fish farming system, said bio-filter unit (1) comprising a container (2) with a filter media (3) and an inner architecture, said inner architecture comprising at least one vertical tube (5) having an open input end (6) and an open output end (7), wherein the bio-filter unit (1) is connected to a pump (8) enabling pumping liquid and filter media (3) from a bottom (9) of the container (2) against a top (10) of the container (2) through said at least one vertical tube (5), wherein an upper plate (15) is arranged inclined downwards from and around the open output end (7) of the at least one vertical tube (5) and ends at a distance from a wall (13) of the container, wherein the upper plate (15) Is perforated and wherein a regeneration water outflow (16) is arranged under the upper plate (15).

10 Claims, 2 Drawing Sheets

(51) Int. Cl.
*A01K 63/04* (2006.01)
*B01D 24/46* (2006.01)
*C02F 103/20* (2006.01)

(52) U.S. Cl.
CPC ........ *A01K 63/045* (2013.01); *B01D 24/4689* (2013.01); *C02F 2103/20* (2013.01); *C02F 2209/44* (2013.01); *C02F 2303/16* (2013.01)

(58) Field of Classification Search
CPC .... A01K 63/042; A01K 63/045; A01K 63/04; B01D 24/4689; Y02W 10/10
USPC .................... 210/615, 616, 617, 618, 167.22; 119/260, 261, 227
See application file for complete search history.

(56) References Cited

U.S. PATENT DOCUMENTS

| 6,319,413 | B1 | 11/2001 | Xia et al. |
| 2006/0196440 | A1 | 9/2006 | McMahon et al. |
| 2011/0065084 | A1* | 3/2011 | Rao ........................ C12M 23/08 435/286.7 |
| 2011/0168616 | A1* | 7/2011 | Robertson ............... C02F 3/302 210/141 |
| 2014/0097143 | A1 | 4/2014 | Clements et al. |

OTHER PUBLICATIONS

European Search Report for Application No. 19859475.6-1004/3849683 PCT/SE2019050825, dated Mar. 17, 2022, 5 pages.
Press release Mar. 26, 2013. California Accepts Parkson's New Efficient DynaSand® EcoWash® Filtration System Under Title 22.[Online] Retrieved from the internet, URL:http://www.parkson.com/news/press-release/california-accepts-parkson-s-new-efficient-dynasand-ecowash-filtration-system: pp. 1-3.

* cited by examiner

BIO-FILTER UNIT FOR A FISH FARMING SYSTEM

FIELD OF THE INVENTION

The present invention relates to a bio-filter unit intended for a fish farming system.

TECHNICAL BACKGROUND

Different filters are used in fish farming systems today. Examples are different types of drum and disc filters and bio filters such as moving bed biofilm reactor (MBBR) and fixed bed biofilm reactor (FBBR). Combinations of the different filter types are normally used in recirculated auquaculture systems (RAS) where the particle removing filters are combined with a biofilter MBBR or/and FBBR. The FBBR add on top a fine particle reduction to the system. It is necessary to have time controlled cleaning and fluidising sequences to avoid uncontrolled undesirable bacterial growth. The problem is how to ensure that the FBBR is homogeneously cleaned.

One aim of the present invention is to provide an improved filter to be used in water recirculation systems intended for fish farming systems, wherein the improved filter provides several advantages in comparison to existing solutions. These advantages relate to e.g. providing an improved regeneration cycle for the water flow, the possibility of an increased total yield and thus degree of reuse of water and an increased efficiency when connecting and disconnecting a filter unit during e.g. a washing cycle or the like.

SUMMARY OF THE INVENTION

The stated purpose above is achieved by a bio-filter unit intended for a fish farming system, said bio-filter unit comprising a container with a filter media and an inner architecture, said inner architecture comprising at least one vertical tube having an open input end and an open output end, wherein the bio-filter unit is connected to a pump enabling pumping liquid and filter media from a bottom of the container against a top of the container through said at least one vertical tube, wherein an upper plate is arranged inclined downwards from and around the open output end of the at least one vertical tube and ends at a distance from a wall of the container, wherein the upper plate is perforated and wherein a regeneration water outflow is arranged under the upper plate.

The bio-filter unit according to the present invention combines the advantages of the MBBR and FBBR in one and the same unit. Furthermore, the bio-filter may establish a controlled and safe environment on a minimum of space, built in a modular system at a factory, and is easy to adapt to the right capacity and to assemble and disassemble. This is further discussed below.

The bio-filter unit according to the present invention is intended to enable inner circulation of the filter media inside of the container. This concept according to the present invention provides a better cleaning cycle and thus regeneration and reuse of water in the entire system as the cleaning process is physically more effective and also provides the possibility of a more effective regeneration and cleaning cycle for a filter intended for a fish farming system.

The bio-filter according to the present invention may be seen as a hybrid of a fixed bed filter and a moving bed filter. The bio-filter according to the present invention performs as a moving bed filter unit when a cleaning cycle is performed, i.e. when the pump flushes the filer media up through the vertical tube so that the filter media then is cleaned from contaminating material on the surfaces by physical movement or turbulent flow. During this cycle the filter media is flushed up through the vertical tube and then out through the same. As further discussed below, the contaminants or residues, such as e.g. particles, and water having a comparatively high concentration of contaminants may then be separated off by being filtered through one or more upper plates (net or grate), where a contaminated fraction may then be led to a regeneration filter unit or back to a pre-filter to enable a separation and possibly also a recirculation over the bio-filter unit. This flush or cleaning cycle and the time period therefore is further discussed below.

Furthermore, the filter media exiting the vertical tube when being pumped up through the vertical tube then settle through the container and a purified water fraction is separated in a lower section of the container. This purified water fraction may then be led back to a fish farming tank.

The standard arrangement used today includes a moving bed filter to enable particle removal and then a fixed bed filter to enable water purification. As may be understood from the description above, according to the present invention this is accomplished in one and the same bio-filter unit.

Furthermore, it should be noted that "the filter media" according to the present invention may e.g. also be called filter substrate, filter elements or bio-(filter) elements or the like.

To provide additional prior art it may be mentioned that in U.S. Pat. No. 5,681,472 there is disclosed a filter tank comprising a sand filter type. The filter tank comprises a filter bed. The treated filtrate is collected in a filtrate zone above the filter bed. This is one important difference when comparing with the present invention. In U.S. Pat. No. 5,681,472 the design is made to provide for purified water to be separated off in the top. This is the opposite to the direction of the present invention. According to the present invention water intended to be separated off for further regeneration, i.e. water which is not clean enough, is separated off in the upper part of the container. Purified water, however, is flown out from the container in the lower part of the container. As stated above, the bio-filter according to the present invention comprises a perforated upper plate which is arranged inclined downwards from and around the open output end of the at least one vertical tube and which ends at a distance from a wall of the container. Moreover, a regeneration water outflow is arranged under the upper plate. None of these features are provided in the sand filter according to U.S. Pat. No. 5,681,472. Furthermore, it may also be said that the type of sand filter disclosed in U.S. Pat. No. 5,681,472 is not intended for large water flows, which is the case of the bio-filter according to the present invention. The bio-filter according to the present invention is intended to be used in fish farming systems where such large water flows are a fact.

Below the present invention is discussed in more detail and different embodiments are provided and explained.

SPECIFIC EMBODIMENTS OF THE INVENTION

First of all, it should be noted that the pump to be used in connection with the bio-filter unit according to the present invention may be of different type and may be located at different positions. In FIG. 1 one alternative of placing is shown. According to one embodiment of the present invention a mammoth pump or air lift pump is connected to the bio-filter unit according to the present invention. Regardless of type, the principle according to the present invention is to provide enough power input to be able to lift or pump the filter elements up through the vertical tube. The pumping medium to be used may e.g. be air such as in an air lift pump.

The inner architecture of the present bio-filter unit may be of different type, geometry and size. The general principle of the present invention is to provide a uniform inner architecture, which may imply that a cross section of the bio-filter unit seen from the side and/or from the bottom and/or from the top provides a uniform inner architecture. This enables a uniform cleaning cycle when the filter media or filter elements settle down through the container outside of the vertical tube after having been pumped up through and out from the vertical tube.

Furthermore, typically the operation is also performed in cycles. As an examples, during a cleaning cycle one filter element may have a retention time of around 3-5 minutes from one vertical point to about the same vertical point in the container, i.e. having been pumped up through the vertical tube from a given starting point and then settled to about the same starting point again. Subsequently to such a cycle then the entire bio-filter is run with the pump in an off mode to be in a fixed bed mode. This period may be kept from 30 minutes up to several hours, e.g. around 2 hours. Then the cleaning cycle in the moving bed mode is performed again.

It should be noted that the filter elements may be of any suitable type, size and material according to the present invention. Also the vertical tube may be of different sizes and comprising different material. Furthermore, according to one specific embodiment of the present invention, the inner architecture comprises several vertical tubes. Moreover, according to yet another specific embodiment of the present invention, said at least one vertical tube, or vertical tubes, are arranged at or near a vertical centre line of the container. This is shown in FIG. 1 as one example and this arrangement is also in line with a uniform arrangement according to the present invention.

The bio-filter unit according to the present invention also enables to lead purified water, which has been filtered, back to a fish farming tank. This may be performed in different ways according to the present invention, however according to one embodiment a mechanical filter is arranged in a lower section of the container of the bio-filter unit. This mechanical filter may be arranged as a perforated disc around the vertical tube at a lower section of the container. This disc may also be seen as a plate. Therefore, according to one specific embodiment of the present invention, a plate is arranged inclined from a wall of the container towards a vertical centre line of the container, being inclined downwards towards the bottom of the container, and being in a full cross section of the container around the vertical centre line, i.e. wherein the plate extends around the entire circumference of the container. This plate arranged in a lower section of the container typically has a circular cross section to make up an entire cross section of the container at a lower position thereof. Moreover, this lower plate is suitably inclined downwards from the walls and towards the vertical tube. This shape may be seen as a cone upside-down when viewing the container in cross section and from the side.

Furthermore, according to one specific embodiment of the present invention, the plate is perforated, such as forming a net or grate. As such purified water may penetrate through the perforated disc, while the filter elements are kept on top of the disc. Moreover, according to yet another embodiment a water outflow s arranged under the plate. The purified water which has been processed in the bio-filter unit according to the present invention may be led to a fish farming tank. This then constitutes part of the regeneration process of a fish farming system.

It should be noted that any shape of the lower plate is possible, however the described alternative above has the advantage of providing a uniform settling of the filter elements which then are led back to the inlet of the vertical tube before being pumped up through the same in another cleaning cycle.

As hinted above, according to one specific embodiment of the present invention, there may also be one or more upper plates arranged close to the outlet of the vertical tube. Therefore, according to one specific embodiment of the present invention, an upper plate is arranged inclined downwards from and around the open output end of the at least one vertical tube and ends at a distance from a wall of the container. Such an upper plate may also be seen as a disc provided around the vertical tube at the outlet of the vertical tube, however this one is inclined downwards from the centre and out against the wall, however of course only a distance so that the portions outside of the upper plate is free for settlement for the filter elements being pumped out from the vertical tube. Moreover, such an upper plate or disc typically has a circular cross section and is thus shaped like a cone with an inclination downwards and the top part around the vertical tube.

Moreover, this plate(s) is intended as a receiving surface and filter part for contaminated filter elements and water flowing out from the vertical tube(s). Furthermore, suitably also this upper plate is perforated, such as being a net or grate. Then the contaminated water and particles which have been removed from the surface of the filter elements penetrates through the perforations and may be flown to a regeneration process. As understood, according to one specific embodiment of the present invention, a regeneration water outflow is arranged under the upper plate. The filter elements do not flow through this upper mechanical filter plate and thus settle inside of the container.

The contaminated water flow and particles may be flown to a separate drum or disc filter or back to a pre-filter, which also may be a drum or disc filter, to enable regeneration also of this flow. Such a pre-filter may also constitute the first step where contaminated water and fish faeces from a fish tank is separated. The water fraction and particles after separation therein may then be flown to a bio-filter unit according to the present invention to enable further purification, separation and finally regeneration of the water flow.

If the contaminated water flow with particles separated off in the bio-filter unit according to the present invention instead is flown to a separate drum or disc filter, such a unit may separate this and the water fraction may be sent back or recirculated back to the bio-filter unit. The particles, however, are removed. As may be understood, there are several different set-ups possible for incorporation of a bio-filter unit according to the present invention in a fish farming system.

Also the step where contaminated water and particles are separated off in the bio-filter unit may constitute a part of a regeneration process of a fish farming system according to the present invention.

The present invention is also directed to a bio-filter system comprising several bio-filter units according to the present invention, wherein each bio-filter unit is connectable to others in a module framework. One example thereof is shown in FIG. 2. A module of bio-filter units according to the present invention may provide an arrangement where the bio-filter units may be connected to each other as uniform units one by one in the module framework. They may have one common outflow for the purified water flow being sent back to the fish farming tank. The same may be valid for a common output flow of contaminated water and particles. Also the inflow for contaminated water sent to the bio-filter units may be provided in one common input flow.

The bio-filter units should, however, also be seen as individual units. This type of configuration implies that one single or several bio-filter units may be disconnected during a rinse cycle or for maintenance while all others are in continuous operation. To connect or disconnect a bio-filter unit in such a module system is simple. Also to increase the capacity by incorporating more bio-filters are simple. Furthermore, the different bio-filter units may operate in different modes at the same time. Moreover, the bio-filter units may operate sequentially. This configuration according to the present invention enables an effective operation and also a high total yield of purified water being sent back to the fish farming tank(s). It should also be noted that the contaminated water flow and residues separated off in the bio-filter units may be sent to one pre-filter unit intended only for the entire module of bio-filter units.

Furthermore, the present invention refers to a fish farming system comprising a fish farming tank and a general recirculation loop which comprises first a pre-filter, e.g. a disc or drum filter, enabling filtering off contaminants intended to be sent to waste and further recirculation of water (and some residues) and wherein the recirculation loop comprises a subsequent bio-filter unit or a bio-filter module system according to the present invention with one or more regeneration filter units with regeneration recirculation loop(s). The regeneration filter units may also be in the form of disc or drum filters. Moreover, these filters may be seen as polishing filters.

Moreover, according to yet another embodiment, the fish farming system also comprises a unit for aeration of and separation of carbon dioxide before the general recirculation loop is completed and purified and aerated water is flown back to the fish farming tank.

Furthermore, the present invention also refers to a method for the operation of a bio-filter unit according to the present invention, wherein the method comprises pumping liquid, thus water and possibly residues, and filter media up from a bottom of the container against a top of the container through said at least one vertical tube in sequences with a certain time range. As an example, this cleaning sequence may e.g. be performed once every 30 minutes up to every 2-3 hours. Moreover, the cleaning sequence may last from 1 to 5 minutes every time. Again, the method according to the present invention enables to operate the bio-filter unit according to the present invention to mimic both a moving bed filter and fixed bed filter in one operation cycle.

In addition to the advantages mentioned above, the bio-filter unit and possible module according to the present invention also enables a simple back flushing operation without generating large amounts of rejects. Furthermore, the configuration also provides 100% control of washing the entire filter bed of elements when a back flushing is performed.

DESCRIPTION OF THE DRAWINGS

Figure 1:
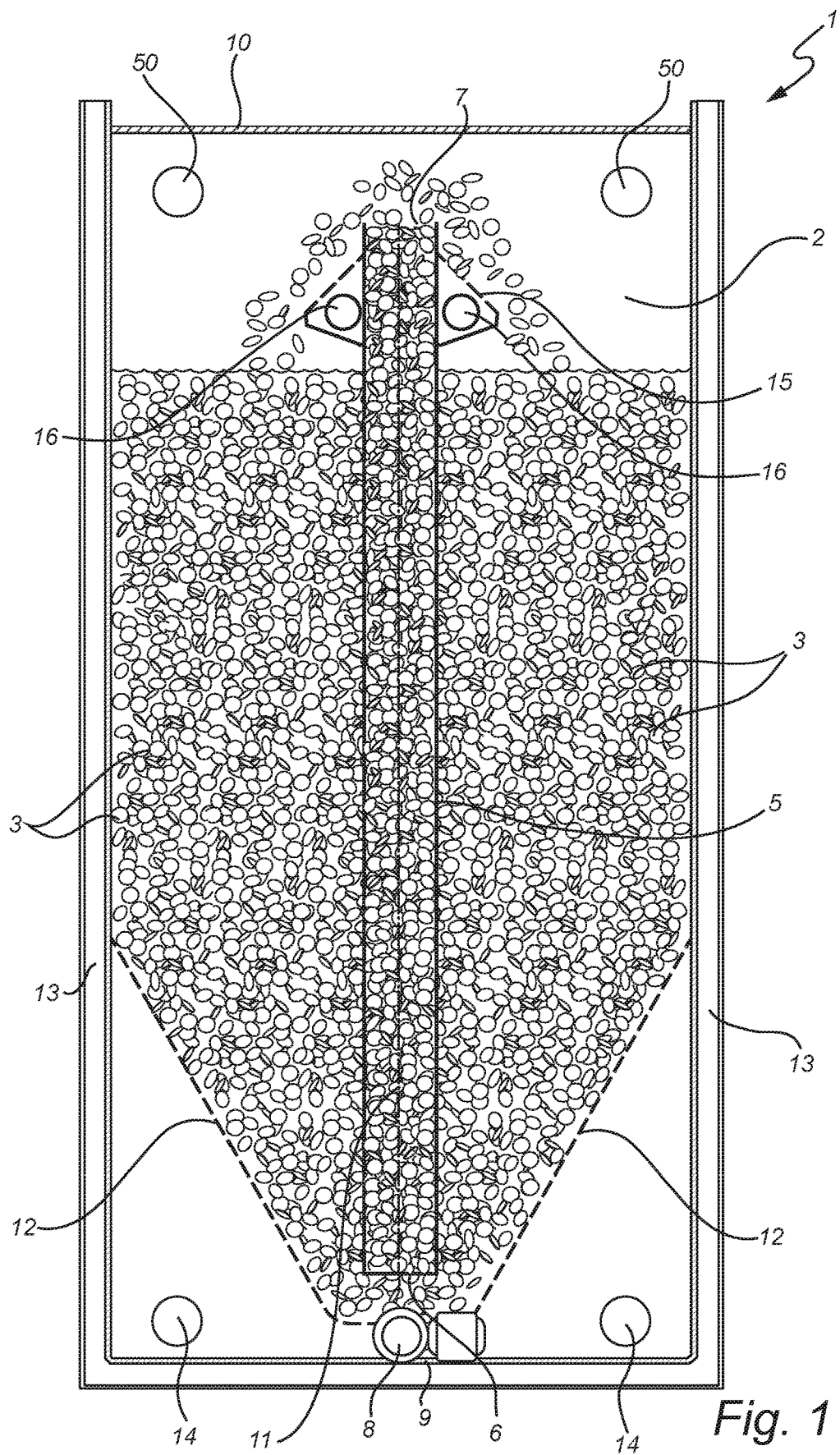
FIG. 1 shows one embodiment of the bio-filter unit.

In FIG. 1 there is shown one embodiment of a bio-filter unit 1 according to the present invention. The bio-filter unit 1 comprises a container 2 which is filled with filter media/filter elements 3. In this case these filter elements 3 are flushing out from a vertical tube 5 implying that the container 2 in this moment is operated in a flushing/cleaning cycle. The filter elements 3 are being pumped up through the vertical tube 5, from the open input end 6 and towards the top 10 of the container 2 and out from the open output end 7, from where the filter elements 3 are settling towards the bottom 9 of the container 2. The driving force is provided by a pump 8, which may be arranged at different positions, but in this case is positioned at the bottom 9 of the container 2. In another situation, tubing may be provided from the bottom and to a pump 8 positioned under the container 2 but at the side.

Moreover, in this case there are two feeding lines 50 supplying water to the container 2, which water is intended to be treated in the bio-filter unit 1. It should be noted that also only one feeding line 50 may of course be used. The water flown into the container 2 comes from a regeneration filter or a pre-filter where particles have been removed.

Furthermore, a perforated plate 12 is arranged inclined from the wall 13 of the container 2 towards a vertical centre line 11 of the container 2, and is inclined downwards towards the bottom 9 of the container 2. Moreover, the plate 12 is arranged in a full cross section around the vertical centre line 11, as viewed from the top 10 or the bottom 9 of the container 2. This implies that all filter elements are arranged to stay inside of the container 2 without passing the plate 12. Purified water passing through the perforated plate 12 is flown out through a water outflow 14, in this case two such water outflows 14, being arranged under the plate 12. The fraction of purified water is then be sent to a fish farming tank from the water outflows 14.

Moreover, an upper plate 15 is arranged inclined downwards from and around the open output end 7 of the vertical tube 5 and ends at a distance from a wall 13 of the container. The filter elements 3 pass or glide on the upper plate 15 and then settle down in the container 2. The upper plate 15 is, however, perforated so that contaminants and contaminated water flowing out from the open output end 7 of the vertical tube 5 may enter through the upper plate 15 to be flown out from a regeneration water outflow 16. This contaminated water fraction may then be sent either back to a pre-filter before the bio-filter 1 or e.g. to a regeneration filter where recirculation of water back to the bio-filter 1 may be performed. A recirculation flow from a pre-filter, such as a disc or drum filter, may be flown into the top of the container 2, e.g. in two pipes, one on each side of the container 2.

Figure 2:
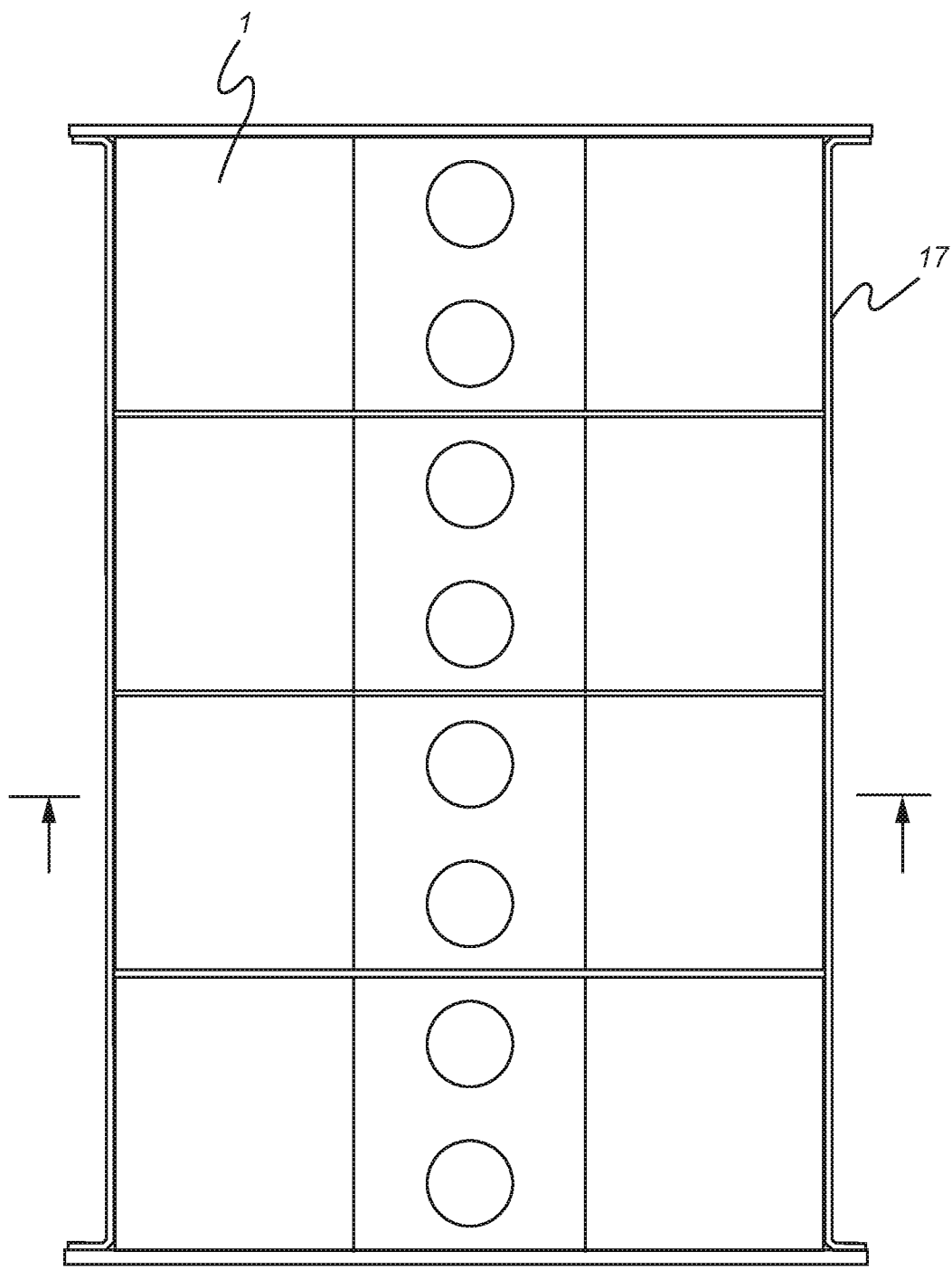
FIG. 2 shows one embodiment of the bio-filter unit framework where several biofilters are shown from the top as linked together in the module framework.

In FIG. 2 there is shown a bio-filter unit module framework 17 according to one embodiment of the present invention. Here several bio-filters 1 are shown from the top as linked together in the module framework 17.

The invention claimed is:
1. Bio-filter unit intended for a fish farming system, said bio-filter unit comprising a container with a filter media and an inner architecture, said inner architecture comprising at least one vertical tube having an open input end and an open output end, wherein the bio-filter unit is connected to a pump enabling pumping liquid and filter media from a bottom of the container against a top of the container through said at least one vertical tube, wherein an upper plate is arranged inclined downwards from and around the open output end of the at least one vertical tube and ends at a distance from a wall of the container, wherein the upper plate is perforated and wherein a regeneration water outflow is arranged under the upper plate.

2. Bio-filter unit according to claim 1, wherein the inner architecture comprises several vertical tubes.

3. Bio-filter unit according to claim 1, wherein said at least one vertical tube is arranged at or near to a vertical centre line of the container.

4. Bio-filter unit according to claim 1, wherein a plate is arranged inclined from a wall of the container towards a vertical centre line of the container, being inclined downwards towards the bottom of the container, and wherein the plate extends around an entire circumference of the container.

5. Bio-filter unit according to claim 4, wherein the plate is perforated.

6. Bio-filter unit according to claim 5, wherein a water outflow is arranged under the plate.

7. Bio-filter system comprising several bio-filter units according to claim 1, wherein each bio-filter unit is connectable to others in a module framework.

8. Fish farming system comprising a fish farming tank and a general recirculation loop which comprises first a pre-filter enabling filtering off contaminants intended to be sent to waste and further recirculation of water and wherein the recirculation loop comprises a subsequent bio-filter unit according to claim 1 with one or more regeneration filter units with regeneration recirculation loop(s).

9. Fish farming system according to claim 8, wherein the fish farming system also comprises a unit for aeration of and separation of carbon dioxide before the general recirculation loop is completed and purified and aerated water is flowed back to the fish farming tank.

10. Method for the operation of a bio-filter unit (1) according to claim 1, wherein the method comprises pumping liquid and filter media up from a bottom of the container against a top of the container through said at least one vertical tube in sequences with a certain time range.

* * * * *